(12) United States Patent
Golubovsky et al.

(10) Patent No.: US 11,176,585 B2
(45) Date of Patent: Nov. 16, 2021

(54) METHOD, SYSTEM, AND COMPUTER-READABLE MEDIUM FOR DISTRIBUTED TRANSACTION PROCESSING

(71) Applicant: Nasdaq, Inc., New York, NY (US)

(72) Inventors: Leo Golubovsky, Franklin Lakes, NJ (US); Chung-Sin Wang, Ridgewood, NJ (US)

(73) Assignee: NASDAQ, INC., New York, NY (US)

( * ) Notice: Subject to any disclaimer, the term of this patent is extended or adjusted under 35 U.S.C. 154(b) by 282 days.

(21) Appl. No.: 15/892,123

(22) Filed: Feb. 8, 2018

(65) Prior Publication Data

US 2018/0315104 A1    Nov. 1, 2018

Related U.S. Application Data

(60) Provisional application No. 62/490,698, filed on Apr. 27, 2017.

(51) Int. Cl.
| | |
|---|---|
| G06Q 40/00 | (2012.01) |
| G06Q 30/06 | (2012.01) |
| H04L 29/08 | (2006.01) |
| H04L 29/06 | (2006.01) |
| G06Q 40/04 | (2012.01) |

(52) U.S. Cl.
CPC ........ *G06Q 30/0601* (2013.01); *G06Q 40/04* (2013.01); *H04L 67/327* (2013.01); *H04L 67/42* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2008/0097893 A1* | 4/2008 | Walsky | G06Q 30/0601 705/37 |
| 2014/0279357 A1 | 9/2014 | Hirsch et al. | |
| 2016/0078538 A1* | 3/2016 | Katsuyama | G06Q 40/04 705/37 |
| 2017/0004563 A1 | 1/2017 | Noviello | |

OTHER PUBLICATIONS

Song, Huazhu, Design and Implementation of Online Stock Trading System, Dec. 1, 2009, 2009 International Conference on Computational Intelligence and Software Engineering, pp. 1-4 (Year: 2009).*

* cited by examiner

*Primary Examiner* — Jeffrey A. Smith
*Assistant Examiner* — Timothy J Kang
(74) *Attorney, Agent, or Firm* — Nixon & Vanderhye P.C.

(57) ABSTRACT

A first transaction computer system and a second transaction computer system are provided. The first transaction computer system receives data transaction requests that may be routed to the second transaction computer system. The second transaction computer system attempts to match the routed data transaction request against pending data transaction requests using hidden attributes.

20 Claims, 4 Drawing Sheets

METHOD, SYSTEM, AND COMPUTER-READABLE MEDIUM FOR DISTRIBUTED TRANSACTION PROCESSING

CROSS REFERENCE(S) TO RELATED APPLICATION(S)

This application claims priority to U.S. Provisional Application No. 62/490,698, filed Apr. 27, 2017, the entire contents of which are hereby incorporated by reference. The entire contents of U.S. Publication No. 2017/0004563 are also incorporated by reference.

TECHNICAL OVERVIEW

The technology described relates to distributed transaction processing. More particularly, the technology described herein relates to transaction processing that uses two different systems to selectively match data transaction requests across two different sorted lists of data transaction requests.

INTRODUCTION

Computer systems can be programmed to handle and process data transaction requests. Such systems can be helpful in many different technical areas including, for example, automated electronic exchange computer systems. These systems can be configured to process millions or billions of transaction requests per day. In these types of environments, data transaction requests are stored in dual sorted lists. A computer system attempts to match newly received transaction requests with a pending request that is on the "opposite" side of the list from the incoming request.

In certain instances how one or more data transaction requests are processed using one system (e.g., a first automated exchange) can be reliant on a state or status of an external system (e.g., another automated exchange) for its processing. This presents a technical problem in the field of distributed transaction processing.

One possible solution to performing processing based on the distributed nature of two (or more systems) is to simply mirror the states of the different systems so they are always synchronized with each other. However, this type of full synchronization becomes inefficient and problematic when the distributed systems need to operate as fast as possible for a large amount of data transaction requests.

Thus, new techniques for how distributed systems may be constructed for handling data transaction requests in a distributed manner are needed.

SUMMARY

In certain example embodiments, a first transaction computer system and a second transaction computer system are provided. The first transaction computer system receives data transaction requests that may be routed to the second transaction computer system. The second transaction computer system attempts to match the routed data transaction request against pending data transaction requests using hidden attributes. In certain examples, a constraint value, which is based on a state of an order book of the first transaction computer system, is included in the routed message sent to the second transaction computer system. A data transaction request that is pending and identified for a match by the second transaction computer system may be locked while confirmation of the match is reported back to the first transaction computer system. A client system associated with the pending data transaction request may receive match information that includes the hidden attributes (e.g. a value, such as a price value, at which the match occurred) while the client system associated with the received data transaction request may not receive that information.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1:
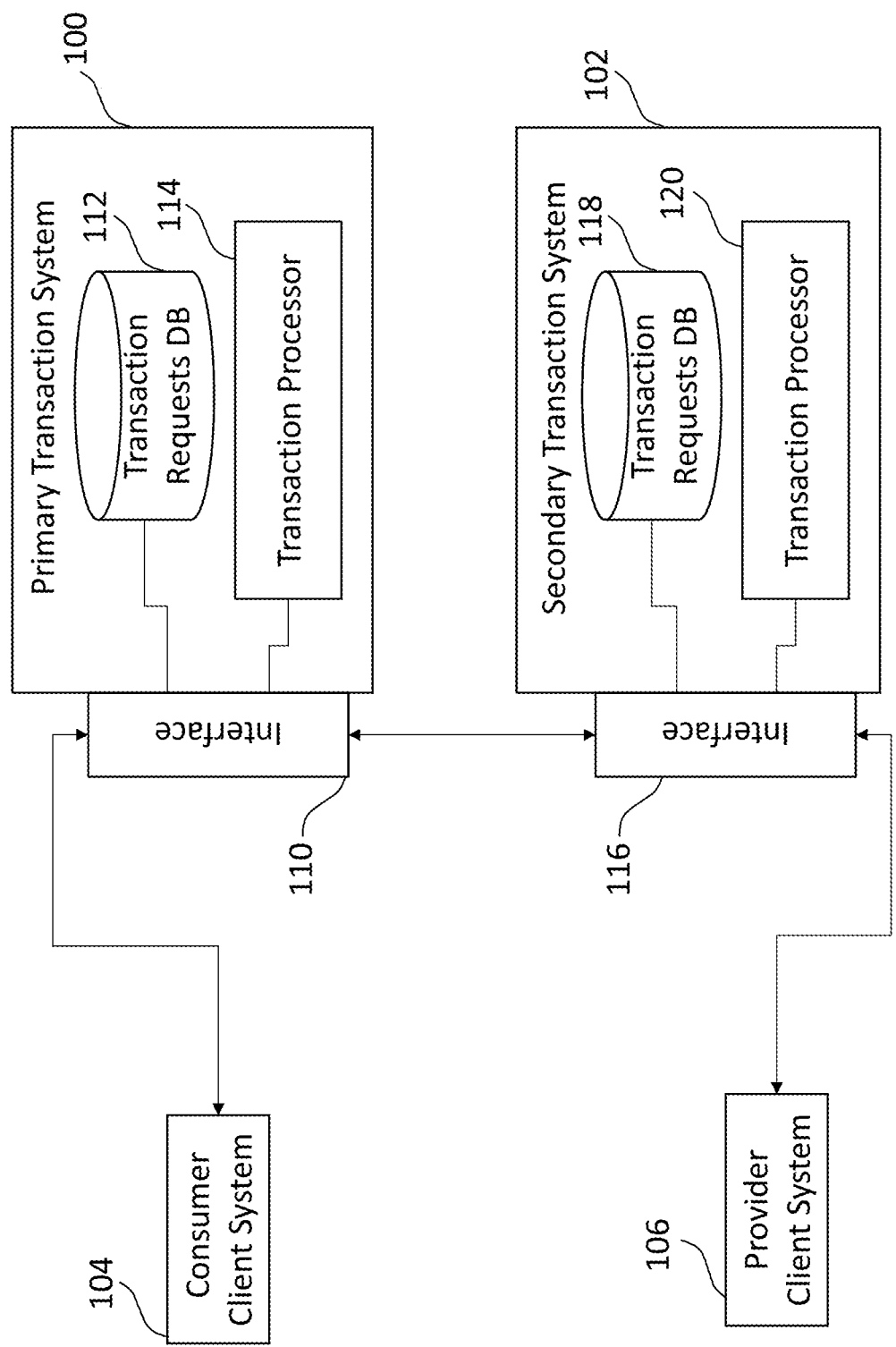
FIG. 1 shows two example computer systems with different order books that communicate to determine matches between new and pending data transaction requests.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a first computer system is provided that stores two sorted lists (also referred to as a first "order book" or a central limit order book, CLOB, herein) of received data transaction requests (also referred to as "orders" herein). Another computer system is provided that stores another pair of sorted lists. The second pair of lists may be referred to as a second order book or a crossrate order book herein.

Certain example embodiments relate to routing received data transaction requests from a first computer system to a second computer system for processing thereon. In certain instances, routing to and processing by the second computer system is recorded for a future rebate. New data transaction requests routed to the second computer system are sent with data (e.g., a constraint value) regarding the current state of the order book on the first computer system. The current state may be, for example, the best bid and offer, BBO, of the first order book. The second computer system then attempts to match the new data transaction request at a price that is between that BBO (e.g., the current state of the first order book) to pending orders that are in the second order book. If a match is found by the second computer system (e.g., against other data transaction requests that are in the second order book), then the details of the match are sent back to the first computer system that then processes or executes the match. A first client computer system that initially submitted the new data transaction request to the first computer system is then notified of the successful match. In certain instances, the notification includes an indication that the match was performed against the second order book. However, the "price" of the final match is not reported to the first client computer system at this time. However, a differential based on the price of the hidden match may be stored and used to determine a rebate for an entity associated with the first client computer system. Details of the match (including the price of the match) may be communicated to a second client system that originally submitted the data transaction request that was first included in the second order book (and matched against the data transaction request from the first client computer system).

In certain examples, the first computer system will, for newly received orders, 1) perform order validation for the order (e.g., including price validation); 2) create and save a reference to the order in the first computer system to later access that order; 3) pass the order with "lit" price information (e.g., based on the first order book) to the secondary computer system; 4) wait for the secondary computer system to respond with an execution or no execution message; 5) generate execution notification and trade confirmations (that may include an indication that the order was processed by the second computer system), perform risk validations, and the like. 6) if the order was not matched on the second computer system then the order may be processed by the first computer system (e.g., a normal match process is performed); 7) notification messages may be generated and sent back to the original order submitting client computer.

Figure 2A:
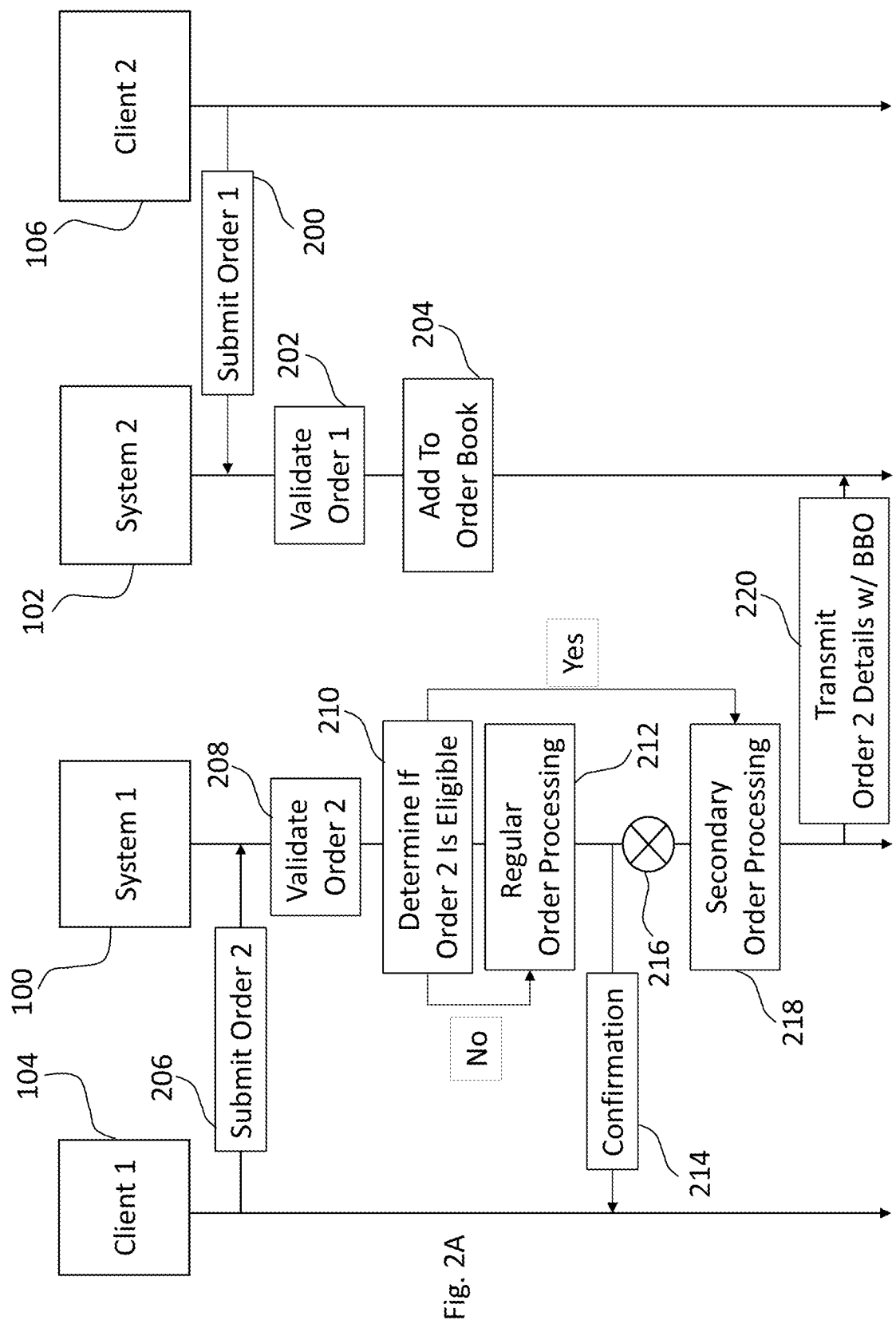
FIGS. 2A-2B show a signal diagram of how data transaction requests are matched using the systems in FIG. 1 according to certain example embodiments.
Figure 2B:
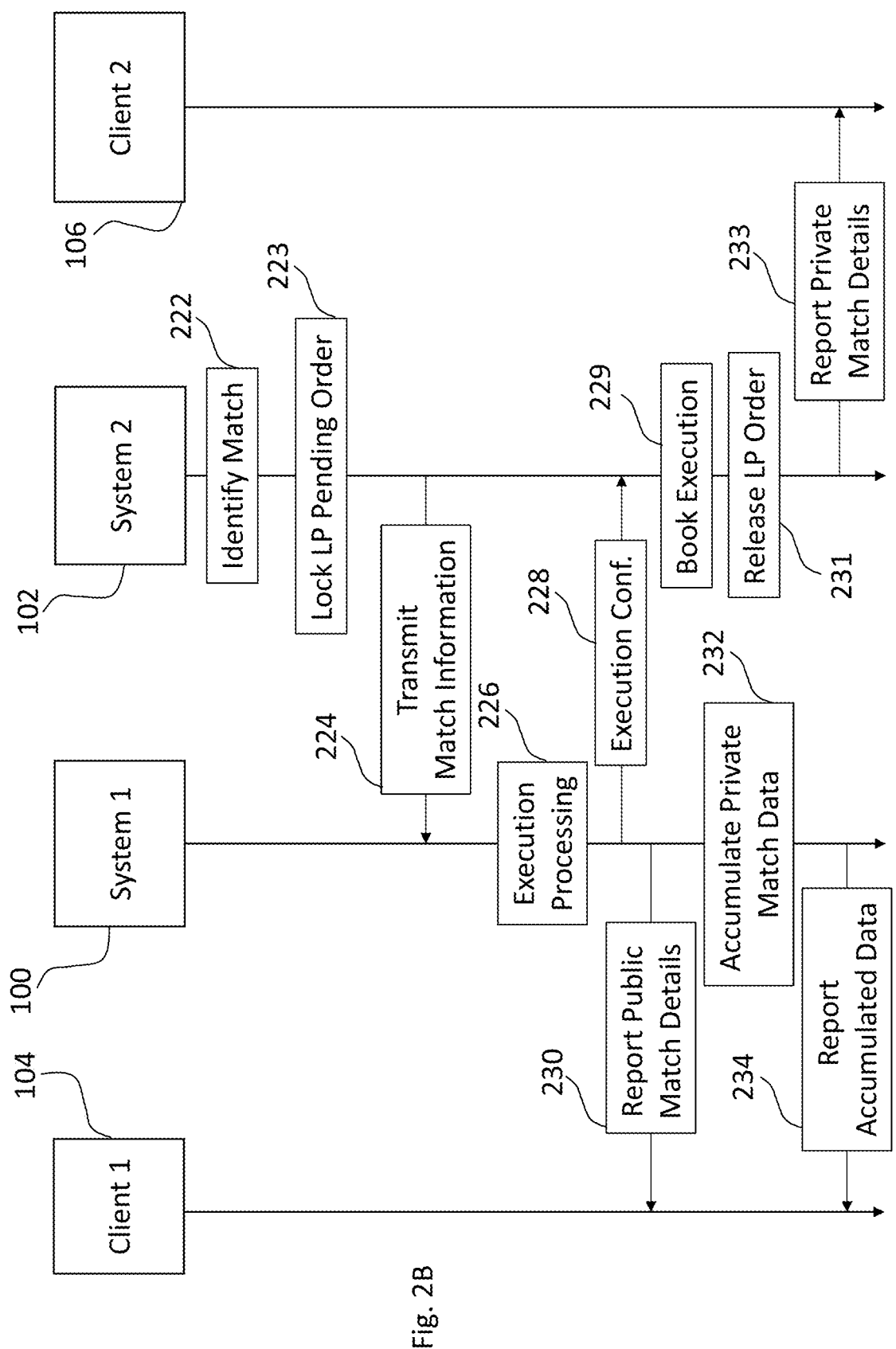
Figure 3:
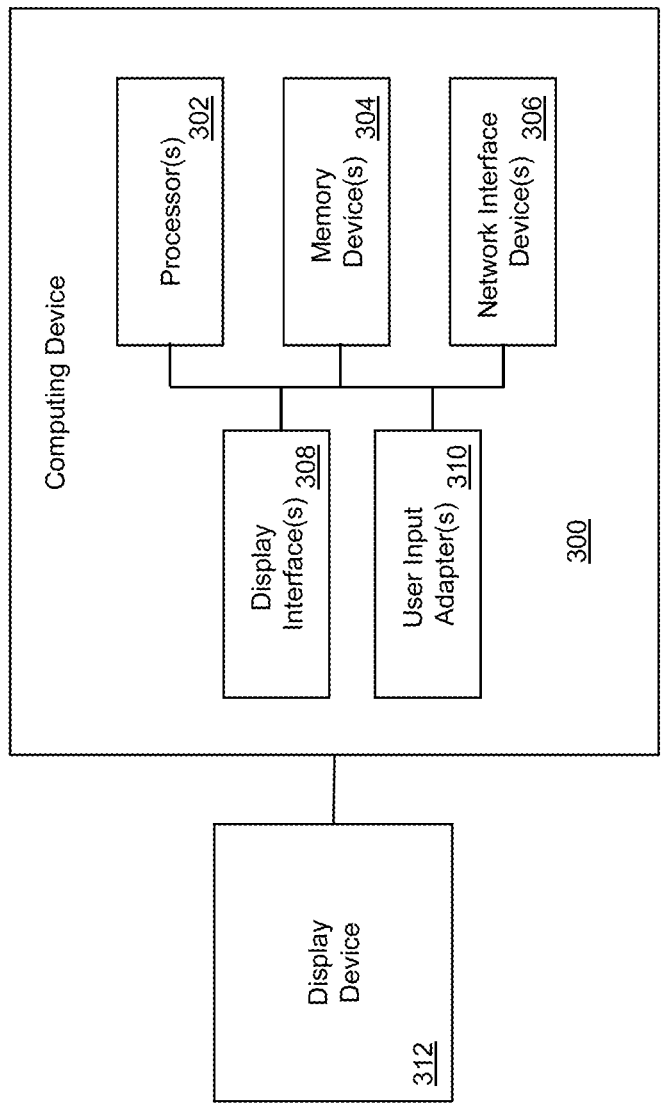
FIG. 3 shows an example computing device that may be used in some embodiments to implement features described herein.

FIG. 1 illustrates the systems used to handle the two separate order books and match incoming data transaction requests to pending data transaction requests. FIGS. 2A-2B show a signal diagram of how data transaction requests are matched using the systems in FIG. 1 according to certain example embodiments. FIG. 3 shows an example computing device that may be used in some embodiments to implement features described herein.

FIG. 1

FIG. 1 illustrates a primary data transaction system 100 (also referred to as system 100 herein) and a secondary data transaction system 102 (also referred to as system 102 herein). In certain example embodiments, both system 100 and system 102 are separate computer systems (e.g., each being a "computer"—such as that shown in FIG. 3). In certain example embodiments, system 100 and system 102 are different computer processes that operate within one operating system using the same set of processing resources (which may include one or more computer systems as shown in FIG. 3). In certain example embodiments, system 100 and system 102 may each operate within their own virtual machine (VM) environment (e.g., a Java™ virtual machine environment). Such VMs may execute on the same underlying computer hardware or may operate on different computer hardware. In other words, while systems 100 and 102 are separate, they may be separated logically (executing within different process spaces of a single computer system) and/or physically (executing on different underlying computer hardware) depending the specific architectural needs of the overall distributed system.

System 100 and system 102 communicate with one another via respective interfaces 110 and 116. In certain example embodiments, interfaces 110 and 116 may represent individual transceivers (e.g., network interface device 306). In other examples, interfaces 110 and 116 may be software based interfaces that allow the separately executing processes or systems to communicate with one another. For example, system 100 may generate an electronic data message that includes information regarding a newly received data transaction request and send that data message to the system 102. Such a message may be sent via a socket connection (e.g., an IP address and port number) established from interface 110 to interface 116. Other types of communication techniques may be used such as, for example, interprocess communication (IPC) techniques (e.g., pipes, shared memory, message applications, and the like).

Both system 100 and system 102 operate by receiving and processing data transaction requests (also referred to herein as orders or electronic orders for simplicity). Data transaction requests are submitted in the form of electronic data messages that include a request for a corresponding order (e.g., a data transaction request to match an order to another pending, or future, order). The data transaction requests may specify a client ID that identifies the client sending the request (e.g., a company, person, etc. . . . ), an instrument ID that identifies a particular instrument for the order (e.g., a ticker symbol or identifier for U.S. treasury benchmarks, or the like), transaction type ID that may identify, for example, whether the request is associated with a sell or buy instruction, an order attribute that specifies whether this a regular order or a hidden order, and a price value that indicates a particular price for the order subject to the data transaction request. In certain examples, other fields may be defined in the electronic order and/or some may be optional.

System 100 includes a transaction request database 112 and a transaction processor 114. The transaction request database 112 may include dual sorted lists of data transaction requests. The lists may be stored in an in-memory data structure (e.g., a sorted list), a flat file, a database management system (DBMS), or the like. In certain instances, the transaction request database 112 may include an order book that stores received orders (e.g., orders that are pending in the order book). The transaction request database 112 may be viewed a first "pool" (e.g., a lit pool or a public pool) of data transaction requests that may be eligible for matching against incoming or received data transaction requests.

The transaction processor 114 includes the logic (e.g., an executable process that performs one or more of the algorithmic steps associated with FIGS. 2A and 2B) for matching orders to one another. For example, when a new order is received by system 100, transaction processor 114 may attempt to match the new order to a contra-side order that is currently in the transaction request database 112. In certain examples (as discussed in greater detail below), the transaction processor 114 (or other functionality of the system 100) may route a newly received order to system 102 via interfaces 110 and 116. The transaction processor 114 may represent a combination of hardware (e.g., a microprocessor such as processor 302) and an executing computer program (e.g., a computer process).

System 100 may also include functionality to provide match confirmations to client systems (e.g., consumer client system 104, provider client system 106, and/or other client systems). For example, system 100 may generate an electronic data feed that corresponds to the current state of the transaction requests DB 112. The electronic data feed may include information on all actions that modify or update records in the transaction requests DB 112. For example, when a newly received data transaction request is matched against a pending data transaction request (e.g., a "buy" order is matched to a "sell" order), a data message may be generated based on that match and be sent out as part of an electronic data feed. The data message may include information regarding the ID (e.g., a ticker symbol) for the matched orders, the amount matched (e.g., the quantity), and/or the value at which the match occurred (e.g., $100).

System 102 includes transaction requests database 118 and transaction processor 120. Like the database in system 100, the transaction requests database 118 includes dual sorted lists of pending data transaction requests that may also be, in certain examples, an order book (or multiple order books—such as one for each instrument). The transaction processor 120 may also operate in a manner similar (or the same) to transaction processor 114 such that it may attempt to match incoming data transaction requests (e.g., those routed from system 100) to data transaction requests that are pending in transaction requests database 118. In contrast to the order book in the transaction requests database 112, the order book in database 118 may be viewed a second "pool" (e.g., a dark pool or a private pool) of data transaction requests that may be eligible for matching against incoming or received data transaction requests (e.g., those that are received directly at system 102 or those data transaction requests routed from system 100). In certain example embodiments, transaction request database 118 may only include data transactions requests for certain types of clients and/or certain types of securities or eligible instruments. For example, a data transaction request submitted to system 102 from provider client system 106 that is for an instrument identifier not included in database 118 may cause the system 102 to generate a message that indicates the data transaction request has been rejected (e.g., because that type of instrument is not eligible to be added to the database 118).

In certain examples, if an instrument for a data transaction request submitted from consumer client system 104 to system 100 is not eligible, but is still routed to system 102 then one of two options may be carried out. If the data transaction request was marked as only being executable against database 118, an error message may be generated and returned to consumer client system 104. If the data transaction request is eligible for processing against database 112 (but not database 118), then it may be returned to system 100 for potential match processing thereon.

In certain examples, databases 112 and 118 may also include user account information (e.g., accounts that are used by client systems to access the primary or secondary transaction systems), instrument information (e.g., information that defines which order books in databases 112 and 118 that a given instrument may be eligible for). Some users may be configured to such that they can submit orders to systems 100, 102, or both systems 100 and 102. In certain examples, only quote orders may be added to the order book in database 118. In certain examples, orders submitted from different provider client systems to system 102 will not match against one another (e.g., bid and offer prices in database 118 may overlap). In certain examples, a user account that is associated with a consumer client system may always "default" to routing orders associated with the user to the secondary transaction system (e.g., the user may not need to specify that a newly submitted order use the routing technique).

One possible difference between systems 100 and 102 is that all actions that update or modify database 112 maybe reported over a public electronic data feed. Database 112 may thus be thought of as a "lit" database because its contents are publically visible (e.g., via the provided publically available electronic data feed). However, database 118 may not operate in such a manner. Instead, database 118 may store data transaction requests that are "hidden" or "dark." Thus, if a new order is matched against a pending order that is in database 118, the (full) details of that match may not be made available to third parties (or even all of the counter parties to the match). Accordingly, one way to view databases 112 and 118 is as two separate "pools" of data transaction requests (e.g., orders)—a "lit" pool and a "dark" pool. For the "lit" pool actions that modify or otherwise update the order book for that pool are reported out over an electronic data feed to third party consumers. In contrast, for the "dark" pool, similar types of actions may not cause information to be transmitted out over an electronic data feed. In certain examples, information regarding the dark pool may be sent out in aggregated form on a time-delay basis (e.g., every 30 minutes, every hour, at the end of the trading day, at the end of week, month, quarter, year, etc. . . . )

System 102 may operate as a stand-alone transaction system (e.g., without also relying on system 100). In certain example embodiments, data transaction requests may be submitted directly to system 102 that may then process, match, and execute such data transaction requests without reporting the results of the execution or match to system 100. Similarly, primary transaction system 100 may operate (e.g., receive, process, execute, and report orders) autonomously from secondary transaction system 102.

In addition, while systems 100 and 102 may be communicatively coupled to one another, their integration may be seamless from the perspective of consumer client system 104 and provider client system 106. Thus, for example, an existing transaction system (e.g., an automated electronic exchange computer system) may be modified to communicate with secondary transaction system without any change in communication protocols or data transaction request field requirements for consumer client systems 104. In certain examples, consumer client systems 104 may thus communicate with a transaction system irrespective of whether or not the transaction system also communicates with a secondary transaction system. However, in certain examples, a flag or field may be added to the communication protocol for submitted data transaction requests. This field may provide a client a way to communicate that it desires to have the corresponding order (potentially) routed to a secondary transaction system.

Returning to FIG. 1, consumer client system 104 and provider client system 106 are implemented on client computer systems (or other computer systems are controlled in some fashion by the "client"). Client computer systems can include personal computers, mobile devices, automated computer systems, cloud-based computer systems, and the like. Generally, systems 104 and 106 may include any computer system (e.g., such as that shown in FIG. 3) programmed to interface with systems 100 and/or 102 for the purpose of submitting data transaction requests (e.g., orders) to either of systems 100 and 102. In certain instances, the provider client systems 106 are those that are controlled or operated by so-called market makers or entities that provide liquidity for a given security—also terms liquidity providers (LPs). In certain instances, the consumer client systems are those that are controlled or operated by entities that generally consume liquidity. For example, a broker that is acting on behalf of individual investors may be a liquidity consumer (LC) entity.

Consumer client system 104 is configured to communicate with system 100 via interface 110. Generally, the consumer client system submits data transaction requests (e.g., orders) that are "lit" (or will be if they are matched against a contra-side pending order). However, as described in connection with FIGS. 2A and 2B, there are certain instances where the full details of a match between orders may not be made fully available.

In contrast to the consumer client system 104, provider client system 106 communicates, via interface 116, with system 102 (in certain instances system 106 may also communicate with system 100 via interface 110). Generally, the provider client system 106 submits data transaction requests (e.g., orders) that are "dark" such that if they are matched against other data transaction requests (e.g., those submitted from a consumer client system), then the full details of the match will not be reported via a public electronic data feed. In certain example embodiments, provider client systems may only submit quotes to system 102. In other words, these data transaction requests may only be added to the database 118 without the possibility of matching against other, pending, data transaction requests that are already stored in database 118.

Example implementations of exchange computer systems that handle orders with dark, private, or hidden attributes (e.g., the price of quantity of the order) are described in U.S. Publication No. 2017/0004563, the entire contents of which are hereby incorporated by reference.

The following is one example of how the systems shown in FIG. 1 may operate. A provider client system 106 submits a sell order of 100 @ 100 to system 102. This order is stored to the transaction requests DB 118. Consumer client system 104 may then submit a buy order for 100 @ 101 to system 100. Upon receipt of this order, system 100 may determine that the order should be first routed to system 102 for potential process. If this buy order is routed to system 102, the transaction processor 120 may determine a matching price of 100.5 for the two orders. However, the price of the match may not be reported via any public electronic data feed. Instead, for example, a matching price of 101 may be reported—the price that corresponds to the publically "lit" price of the sell order submitted by the consumer client system 104.

As explained in greater detail below, while a match may be determined by the transaction processor 120 of system 102, the details of that match (and how the match will be executed) may be transmitted and handled by system 100. Once the execution information is returned to the system 100, then that system may be responsible for executing the "trade," reporting trade confirmations, validating the order, and handling other post-trade functionality.

FIG. 2A-2B

FIGS. 2A and 2B shows a signal diagram of how data transaction requests are matched using the systems in FIG. 1 according to certain example embodiments.

At 200, the provider client system 106 submits a data transaction request (e.g., an order) to system 102. The submitted information may include data fields that include: 1) a price value, 2) a quantity value, 3) an identifier (e.g., a ticker symbol), 4) the type of order (e.g., buy or sell, or bid or offer), 5) a discretion attribute, and other fields.

At 202, the system 102 validates the order received from the provider client system 106. This may include validating that the price and quantity values are valid for the submitted order. If system 102 determines that the order is invalid it may transmit an error message to the provider client system 106 with details of why the order is invalid (e.g., due to an invalid quantity value or the like). On the other hand, if the order is validated it is then added to the order book 118 at step 204. Once added, "order 1" (also referred to as a liquidity provider (LP) order) will remain there until it is canceled or matched against a contra-side order (e.g., that has been submitted from client system 104).

In certain example embodiments, orders submitted from provider client systems 106 may specify a "lit" price and discretion price (e.g., that may be an absolute price or one that is offset from the provided lit price). In certain examples, the order may only include a discretion price (e.g., a number of ticks) and the BBO that is maintained by system 100 and/or system 102 may be used to determine the final discretion price (e.g., final price=tick internal*number of ticks+maintained BBO). In certain examples, the same provider client system 106 may submit multiple different orders that all rest within the order book of database 118 at different price levels (e.g., for the same instrument).

At step 206, "order 2" (also referred to as a liquidity consumer (LC) order) is submitted from the consumer client system 104 to system 100. As with order 1, order 2 is then validated at step 208. Order 2 may be one of multiple different types of orders including an immediate or cancel (IOC) order, a limit order, a market order, or the like. In certain examples, the "price" that is used for orders submitted from a consumer client system 104 must be a valid "lit" price (e.g., at a valid tick value for a given instrument). However, in certain implementations, the price may include a hidden component (e.g., a number of valid discretion ticks or a price at which the order may execute).

At step 210, system 100 determines if order 2 is eligible for routing to system 102. In certain examples, the determination and subsequent routing occurs substantially immediately (e.g., less than 1 second or event less than 100 microseconds).

A determination as to whether or not to route the received order to system 102 can be based on one or more different factors. In certain examples, if the submitted order includes a specific flag (e.g., a NO_ROUTE flag) it will not be routed to the secondary transaction system 102. In certain examples, only certain types of accounts, users, or entities may be eligible to submit orders that are eligible for routing. In certain examples, the submitted order may indicate what percentage of the order is eligible for matching against orders in order book 112 and/or a percentage of the order that is eligible for matching against orders that are resting in order book 118. For example, an order may indicate that only 20% of the order is eligible for matching against order book 112. Accordingly, if 100% is matched against order book 118, none will be matched against order book 112. However, if 0% is matched against order book 118, then only 20% of the original size of the order may be matched against order book 112.

In any event, at step 210, system 100 determines if order 2 is eligible for routing to system 102. If order 2 is not eligible for routing then a regular matching process is executed at step 212. This may include matching against pending orders that are in order book 112 and/or adding order 2 to order book 112 (e.g., if order 2 is not an "immediate or cancel"—IOC—order). After handling the matching process at step 212, a confirmation message and/or execution message may be transmitted to consumer client system 104 at step 214 and the process ends at step 216 (e.g., system 100 continues to wait for new orders to be received).

If, however, order 2, is eligible for routing then, at step 218, secondary order processing is carried out. The secondary order processing includes creating a reference for order 2 and saving it in order book 112 (or another part of database 112). The creation of this reference may ensure that when a successful execution message is returned from system 102 that the order will be properly processed by system 100. The reference information also provides a way for system 100 to handle subsequent requests regarding order 2 that are received after order 2 is routed to system 102, but before it has returned from system 102.

When order 2 is routed to system 102 for processing, the current best bid and offer (BBO) value for the order book 112 may be retrieved and used as a constraint or other value when the order is processed by system 102. This value may include the best offer and the best bid that, as explained herein, act as constraints on how matches may be identified by system 102. The value included with the routed order is the current "lit" price. In other words, this constraint is the price that is visible and at which the new order would have traded had it executed against order book 112. As the order book of system 100 is continually updated (e.g., as new orders are added to the book), the BBO may change in accordance with the changes to the order book. Thus, other orders that are routed may have a different constraints based on the dynamically changing BBO. Such information may be continually updated and/or maintained by system 100. Accordingly, the BBO may be thought of as a dynamic value that is a function of the current state of the transaction request DB 112 (e.g., the order book). In certain examples, the determination of the BBO may include receiving data from external sources (e.g., other order books or exchange).

The information that is gathered at step 218 may be used to generate a further data message that is sent to system 102. The further data message may include an identifier for the user (or other entity) that submitted order 2, a security identifier (e.g., a ticker symbol or other identifier), the price included in the order details of order 2, the "lit" price of order book 112 (e.g., the current best bid and offer—BBO) or other constraint value (e.g., one that may be preset or based on some other metric), the original data transaction request, and/or other parameters.

Note that by routing order 2 to system 102, there is a possibility that orders received by system 100 will be executed out of order. For example, if consumer client system 104 submits a first order that is routed to system 102 followed by a second order that is not routed to system 102, it is possible that the second order will be booked (or even executed) (e.g., at step 212) before system 102 returns (e.g., if no match was identified) the first order to system 100 for processing. In other words, system 100 may respond to the consumer client system 104 for the second order prior to responding to the consumer client system 104 for the first order. It will be appreciated that this may cause confusion with clients that submit orders. However, as discussed herein and in accordance with certain example embodiments, a routed order may maintain a reference identifier that can act as a place holder in the execution line of system 100. Thus, with such a reference, orders for a given client may be processed in order (even if the second order is delayed in processing due to a the first order being routed to system 102).

Returning to FIG. 2A and step 220, a data message is transmitted (e.g., via an electronic data communications network), from system 100 to system 102. When this further data message is received by interface 116, system 102 performs secondary match processing at 222 where a match is identified. In particular, the transaction processor 120 attempts to find a match using the order information of order 2 that was included in the transmitted message sent from system 100 against orders that are pending in order book 118.

If no match is found (not shown in FIG. 2B), then an unable to trade or non-execution message is returned to system 100 and order 2 may be processed normally (e.g., as described in connection with step 212).

As described above, order 2 may include a data field that indicates that only a certain portion (e.g., a percentage) of order 2 is to be matched using the process in step 212 (or 222) (e.g., against the regular order book). If order 2 indicates that no percentage of the order is eligible for matching against order book 118, then an unable to execute or non-execution message may be returned to consumer client system 104.

In step 222, a match between order 2 (the LC order) and order 1 (the LP order) that is pending in order book 118 is identified. Once a potential match is identified (between orders 1 and 2 in this case), then execution information is sent back to system 100 at 224 and order 1 is locked within order book 118 at 223. During the time period between 223 (the locking of order 1) and 231 (release of order 1), order 1 cannot be acted upon or modified. For example, other orders will not be able to match against it and the LP will not be able to modify, cancel, or update the order while it is locked.

In certain example embodiments, the transaction processor 120 will never execute or identify a match between orders at a price that is worse that the price at which order 2 was submitted. In certain examples, the transaction processor 120 will only execute a match if it is between the "top" lit prices (e.g., greater than the bid and lower than the offer of the BBO). In certain examples, exceptions to this type of matching requirement may be implemented (e.g., if there is a one-sided order book, if there is no lit price (such as trading just opened), etc. . . . ).

In certain example embodiments, order 2 is only eligible to match against a single quote at a single price (e.g., it will not match at multiple price levels for fulfillment) from order book 118.

At step 224, transaction processor 120 generates a responsive message that is sent back to system 100 via interfaces 110 and 116. The responsive message may include the "actual" price of the match (e.g., the hidden price at which the match occurs). Other types of information related to the identified match may also be transmitted back to system 100.

System 100 receives the message transmitted at 224 and then performs execution processing at 226. Execution processing by system 100 may include credit validation processing (e.g., determining if the client associated with order 2 has sufficient credit to execute the match identified by system 2). If the execution processing succeeds (e.g., if the credit validation does not return an error), then an execution confirmation or acceptance message is generated at 228 and sent back to system 102.

At 230, system 100 generates and reports, to at least the consumer client system 104, the public details of the match identified by the secondary transaction system 102. In particular, the "hidden" price is not transmitted at 230 to the consumer client system 104. Instead, the public price (e.g., a price at the BBO) is used for this message. However, in certain example embodiments, the message may include an indication that the match was in actuality performed using the secondary processing system 102 and was thus at some (e.g., unspecified) price other than the "public" price. For example, the message may include a public price field of 100 with another bit field marked to "true" to indicate that that match occurred at a price between the best bid and offer (e.g., at a hidden or private price). In certain examples, the message to consumer client system 104 may include more detailed information on the actual or hidden price.

System 100 may also generate public match messages that are transmitted out via an electronic data feed to third party computer systems (e.g., those system that are not parties to the match between orders 1 and 2). Like the message sent to consumer client system 104, this message may also use the "public" price of any match rather than the "private" price.

In general, system 100 provides trade confirmation and notification functionality—even if the match or trade occurred (or was identified) on system 102. In certain examples, this may include generating trade confirmations for both the provider and consumer client systems. In certain examples, this may include generating all required electronic data feed and AFT confirmations—including guaranteed delivery of all LC, electronic data feed, and AFT confirmations. In certain examples, system 100 generates trade confirmations that are sent back to system 102 for dissemination to the provider client system 106.

Returning to FIG. 2B, at 229, system 102 receives the execution confirmation message sent at 228 from system 100 and books the execution of the match between orders 1 and 2. Then at 231, order 1 is released from the previously implemented "lock" (assuming there is any quantity left over) to allow for other orders to match against it (or for the order to be modified, updated, or canceled).

At 233, system 102 generates a message that includes execution notification and trade confirmation regarding the recently matched orders and sends it to provider client system 106. Unlike the notification sent to the consumer client system 104, this notification may include the actual price at which the match occurred. The notification returned to provider client system 106 may also include the "lit" price (e.g., both the bid and offer) at the time of the match between orders 1 and 2. In certain examples, this information is provided to the provider client system 106, but not to the consumer client system 104.

As part of the post-trade processing by system 100 (or system 102), the details of each match at step 232 may be stored. Based on this stored information, an accumulated data report may be generated at step 234 and transmitted to the consumer computer system 104 (or another computer system). The transmitted report may be delivered via e-mail to a client computer system or posted to a website for a user to download. In certain examples, the report may be formatted and transmitted as part of an electronic data feed. The report may indicate, for example, the total price differential between the "reported" cost of a trade and the actual cost of the trade.

In certain examples, reports may provide a retrospective look at how orders submitted from clients have been processed by systems 100 and/or 102. Reports may include determining an overall "toxicity" of the orders that have been processed using the techniques herein. Toxic orders (or the flow of orders from a given client) are those that tend to negatively affect the market. For example, orders that move the market may be considered toxic as opposed to those orders that follow the market. Orders that move the market in the opposite direction of its more "natural" movement may be considered toxic.

Identification of such orders is a difficult task because it is difficult to know the "direction" that the market is heading at a given point in time. Accordingly, in certain examples, the overall order flow from a given participant or client is aggregated over a period of time and used to measure where the market is number of seconds (e.g., 30 seconds) or minutes later from when orders for that client have been processed. This data may be averaged to obtain the overall flow for that client for all of their orders. If the average processing for orders for a given client comes out neutral (e.g., within a predefined range) or in the market's favor, then orders from that client may be classified as non-toxic. However, if the data shows a client is continually obtaining benefits in their favor (e.g., matches they achieve are better than what could be obtained 30 seconds after the fact) it may point to orders from this client as being toxic.

The following are example reports that may be generated: 1) an intra-day trade report that is only sent out to LCs that generated trades during the defined interval; 2) and end of day (EOD) report that is sent to all LCs regardless of the fact if they generated trades that day or not; 3) an LC report that provides data on all activity for that liquidity consumer. The reports may be delivered via CSV, web page, excel, PDF, or the like.

The intra-day trade report is delivered at predefined time interval (a minimum×seconds, minutes, or hours) after a trade (e.g., 2-3 minutes, one hour, etc. . . . ). This report may be generated and emailed to an LC. The email will include the following information and include every trade for the current date for trades older than X. The report will provide information on potential price improvement so far. The included fields are: 1) Time—time of the trade; 2) Trade ID—Trade reference number; 3) Instrument—traded security name; 4) User—User ID logged into system 100; 5) Volume—size of the trade; 6) Side—Buy/Sell; 7) LC Trade Price—reported trade price to LC based on lit price at the time; 8) Price improvement—expressed as $'s per $1 mm (e.g., if the Price Improvement is 1 tick, then this field would show $5); 9) LC Potential Price improvement—LC price improvement share expressed as total $'s (e.g., Traded size*price improvement per $1 mm*LC price improvement share percentage—if the trade size is $10 mm and the price improvement is $10 and the LC share percentage is 50%, this would be 10×10×0.5=$50); and 10) Running LC Potential Price improvement total for the day up to this point expressed in total $'s (so a running total of '9' above for all trades done on this specific day.

The end of day trade report will be generated for all trades for this business day and also report on current and running toxicity as of end of the day. The report will contain every trade information as per inter-day report and additionally market impact information. The report may include the following information: 1) Time—time of the trade; 2) Trade ID—Trade reference number; 3) Instrument—traded security name; 4) User—User ID logged into system 100; 5) Volume—size of the trade; 6) Side—Buy/Sell; 7) LC Trade Price—reported trade price to LC based on lit price at the time; 8) Price improvement—expressed as $'s per $1 mm (e.g., if the Price Improvement is 1 CR tick, then this field would show $5); 9) LC Potential Price improvement—LC price improvement share expressed as total $'s (e.g., traded size*price improvement per $1 mm*LC price improvement share percentage—if the trade size is $10 mm and the price improvement is $10 and the LC share percentage is 50%, this would be 10×10×0.5=$50); 10) Running LC Potential Price improvement total for the day up to this point expressed in total $'s (e.g., a running total of '9' above for all trades done on this specific day); 11) Market Impact Amount—expressed as $'s per mm; 12) Market Impact Amount—expressed in total $'s (Size*Market Impact per $1 mm); and 13) Running totals at bottom of report for LC Price Improvement share and Market Impact Amount—expressed in total $'s.

Liquidity provider reports may also be generated and these reports may be used internally and/or provided to the LPs. The reports may be, for example, used to confirm that a given LP is supplying enough "good" liquidity for a given instrument.

A first report may include a market quote participation report that may be used for an LP and/or internally. This report may be generated at EOD. The report may include the percentage of time that LP provided market per security/per sector per side with required minimum price improvement and minimum depth (notional). Each LP will be required to provide market for minimum defined percentage of the day. Percentage of time that LP provided market per security/per sector per side with average price improvement and average depth (notional).

A second report may include a market trade contribution ranking report generated at EOD. This report will focus on LP and total traded volume in system 102 and how this LP percentage of the traded volume and potentially the ranking for the LP (e.g., amongst other LPs). The report should be able to provide the metric for current trade and for specified past X days. The report would include the following information: 1) Volume traded in system 102 for current trade date per security and total; 2) Volume traded in system 10 for current trade date by LP per security and total; 3) Current trade date ranking for LP based on traded volume per security and total; 4) RATV (Rolling Average Total Volume of all transactions in U.S. Treasury OTRs by all LPs over the previous 10 QTDs) for the last ten days for all securities traded in system 102; 5) RASV (Rolling Average per Security Volume of all transactions in each of the U.S. Treasury OTRs by all LPs over the previous 10 days) for the last ten days per security traded in CR; 6) Number of LPs in system 102; 7) LP RATV; 8) LP RATV share counted as: "RATV/Number of LPs×2"; 9) LP RATV rule violation flag; 10) LP RASV per security; 11) LP RASV share per security counted as: "RASV/Number of LPs×4"; and 12) LP RASV rule violation flag.

A third report may be a EOD transaction report that contains a recap of the trade level detail from the trade day activity including: 1) Time—time of the trade; 2) Instrument—traded security name; 3) User—User ID logged into systems 100 or 102; 4) Trade reference; 5) Volume—size of the trade; 6) Side—Buy/Sell; 7) LC Trade Price—reported trade price to LC based on lit price at the time; 8) LP Trade Price—trade price actually done in CR as reported to LP; 9) F-VWAP; 10) Market impact—expressed in total $'s; and 11) Running sum of market impact—$'s.

A fourth report may be an Expected Liquidity Provider Rebate Report that is run at the end of day. This report gives a running total for QTD. The report may provide each LP with end of the day market impact and rebate report with information on running overall market impact amounts in the pool and the market impact associated with their specific transactions both by individual security and in aggregate across nettable sectors. The report may include: 1) Instrument—traded security; 2) Total Volume—Total system 102 traded volume per security; 3) LP Volume—LP traded volume per security; 4) Total Market Impact per security—Market Impact associated with trades for this specific security across system 102; 5) LP Total Market Impact per security—Market Impact associated with trades for this LP for this specific security; 6) Total Market Impact per sector—Market Impact associated with trades for this specific sector across system 102; 7) LP Total Market Impact per sector—Market Impact associated with trades for this LP for this specific sector; and 8) Expected LP rebate—expected LP rebate up to QTD.

A fifth report may be a LP trade analysis report (provided per LP). This report may provide information regarding why the LP did not trade and may include: 1) Report will list every trade that happened in CR pool; 2) Time of trade; 3) Security; 4) Volume; 5) CR Price of trade; 6) Permitted spread at the time (bid/offer); 7) Indicator if traded by that LP or not; and 8) If not traded by that LP then reason: a) Better price available than LP, b) Competition at same price level (someone was in front), c) Size not satisfied (LP had price but not size), and d) LP did not have quote at the time.

A sixth report may include a Detailed Market Participation report that is provided at EOD. This report may provide a detailed break-down for the time when the LP is quoting per security/per sector. The report may include: 1) Percentage information per specified time windows and per day total; 2) Percentage for when minimum price improvement and minimum depth is satisfied, by LP; 3) Percentage of time when minimum one sided price improvement is provided but minimum depth is not satisfied by LP; and 4) Percentage for when minimum depth is satisfied but minimum one sided price improvement is not provided, by LP.

A seventh report may be a market Impact report at the end of day (with a running total for QTD). The report may provide each LP with end of the day toxicity report with information on running overall toxicity in the pool and toxicity associated with their transactions. The report may include: 1) Instrument—traded security; 2) Total Volume—Total system 102 traded volume per security; 3) LP Volume—LP traded volume per security; 4) LP Toxicity—Toxicity associated with trades for this LP for security; 5) System 102 Toxicity—Total system 102 venue toxicity for security.

The following is an example for how an entity may be rebated for participating in the process described in FIGS. 2A and 2B. In the following scenario, the highest public bid is 100, the lowest offer is 101, and an LP order is pending with system 102 with a "private" offer of 100.5. An LC order is received by system 100 with a bid of 101. Under normal circumstances, the LC order would match against another pending order for 101 that is resting in the order book of system 100. However, in this case, the LC order is routed to the secondary transaction system that matches at 100.75 (or 100.5 in certain examples). While the match occurs at 100.75, the price that is reported to the consumer client system 104 will be 101. The price of the actual match (e.g., 100.75) is reported to provider client system 106. In certain example embodiments, the difference between the public and private prices may be delivered to an account in bulk. In other words, when the trade is first validated an LC will "pay" the lit price, but may be rebated based on the hidden price. This may be accomplished by incrementing a credit account for an LC that is based on the difference between public price and the private price (or a portion of that difference).

Other functionality found in systems 100 and/or 102 may include the following features. In certain examples, cancellation or modification of order 2 may be blocked once order 2 is routed to system 102. In particular, there may be race condition that occurs when an order is routed but still has not been finally executed. When the order is routed to system 102 it no longer "exists" in system 100. Thus, if a user submits an order that is routed to system 102, but sends in a cancellation request before system 100 "knows" the status of that order (e.g., before it is returned by system 102), system 100 may generate and send a message that the order is "not found." But, once the order is returned by system 102 to system 100, an execution message may be relayed from system 100 to consumer client system 104 indicating that the canceled (but not found) order has now be executed. To address this potential problem, a reference for order 2 may be added to system 100 (e.g., by being stored in database 112). Thus, when consumer client system 104 submits a cancellation request, that request may be stored in association with the reference and system 100 may then appropriately cancel the order when the order is returned from system 102. For example, when the order is returned from system 102, the request to cancel the order may be triggered upon system 100 recognizing that the order has been returned for processing.

Another issue that may be addressed with storage of a reference is duplication of the order ID. In this scenario, a customer sends a first order with ID X, which is routed to system 102 by system 100. The customer accidently sends a second order with the same ID. This order is not routed, but instead is regularly processed by system 100 (e.g., at step 212). Now there are two orders with the "same" ID—and both could theoretically execute. The addition of the reference to the database 112 may alleviate this provide as system 100 may determine if there is another order that is already pending with system 102.

Generally, no real-time or conflated data streams of system 102 will be provided to external computer systems. But, in certain example embodiments, an internally accessible data stream regarding activity of the order book in database 118 may be provided. This data stream may be used so that a provider of secondary transaction system 102 can monitor and/or report on its status.

In certain example embodiments, orders that are executed or matched using system 102 must satisfy the following conditions: The execution price displayed to the LC must be greater than or equal to the actual execution price for the match plus a minimum required toxicity holdback. The shown execution price is a price that is a valid lit boundary. The actual execution price is a quote price submitted by an LP at which the trade is executed. The minimum required toxicity holdback may be the smallest current fraction required to be held back for toxicity purposes.

In certain example embodiments, the minimum required toxicity holdback may be zero. In certain example embodiments, the minimum required toxicity holdback can be configured as a default for the whole system 102, per instrument, or each user and/or LC may have their own value. Advantageously, the later of these implementations may ensure that more toxic LCs are subject to higher hold-back rates. In certain examples, the minimum holdback may be dynamically changed (e.g., during a trading day). In certain example embodiments, a process may be implemented to measure toxicity. Based on these calculations a decision may be made to dynamically change the "minimum required toxicity holdback".

FIG. 3

FIG. 3 is a block diagram of an example computing device 300 (which may also be referred to, for example, as a "computing device," "computer system," or "computing system") according to some embodiments. In some embodiments, the computing device 300 includes one or more of the following: one or more processors 302; one or more memory devices 304; one or more network interface devices 306; one or more display interfaces 308; and one or more user input adapters 310. Additionally, in some embodiments, the computing device 300 is connected to or includes a display device 312. As will explained below, these elements (e.g., the processors 302, memory devices 304, network interface devices 306, display interfaces 308, user input adapters 310, display device 312) are hardware devices (for example, electronic circuits or combinations of circuits) that are configured to perform various different functions for the computing device 300.

In some embodiments, each or any of the processors 302 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 302 uses an instruction set architecture such as x86 or Advanced RISC Machine (ARM). As explained herein, multiple computer systems may collectively form a cloud computer system and each one of the computer systems is configured to host one or more virtual machines (which are also referred as instances herein)

In some embodiments, each or any of the memory devices 304 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 302). Memory devices 304 are examples of non-volatile computer-readable storage media.

In some embodiments, each or any of the network interface devices 306 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings. In certain example embodiments, network interfaces and/or transceivers may allow the transmission and reception of messages and/or packets via an electronic data communications network. For example, a packet switched network (with each packet containing a header and a payload) may be used to transmit and receive data from remove one computer (and associated interfaces) to another.

In some embodiments, each or any of the display interfaces 308 is or includes one or more circuits that receive data from the processors 302, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 312, which displays the image data. Alternatively or additionally, in some embodiments, each or any of the display interfaces 308 is or includes, for example, a video card, video adapter, or graphics processing unit (GPU).

In some embodiments, each or any of the user input adapters 310 is or includes one or more circuits that receive and process user input data from one or more user input devices (not shown in FIG. 3) that are included in, attached to, or otherwise in communication with the computing device 300, and that output data based on the received input data to the processors 302. Alternatively or additionally, in some embodiments each or any of the user input adapters 310 is or includes, for example, a PS/2 interface, a USB interface, a touchscreen controller, or the like; and/or the user input adapters 310 facilitates input from user input devices (not shown in FIG. 3) such as, for example, a keyboard, mouse, trackpad, touchscreen, etc. . . .

In some embodiments, the display device 312 may be a Liquid Crystal Display (LCD) display, Light Emitting Diode (LED) display, or other type of display device. In embodiments where the display device 312 is a component of the computing device 300 (e.g., the computing device and the display device are included in a unified housing), the display device 312 may be a touchscreen display or non-touchscreen display. In embodiments where the display device 312 is connected to the computing device 300 (e.g., is external to the computing device 300 and communicates with the computing device 300 via a wire and/or via wireless communication technology), the display device 312 is, for example, an external monitor, projector, television, display screen, etc. . . .

In various embodiments, the computing device 300 includes one, or two, or three, four, or more of each or any of the above-mentioned elements (e.g., the processors 302, memory devices 304, network interface devices 306, display interfaces 308, and user input adapters 310). Alternatively or additionally, in some embodiments, the computing device 300 includes one or more of: a processing system that includes the processors 302; a memory or storage system that includes the memory devices 304; and a network interface system that includes the network interface devices 306.

The computing device 300 may be arranged, in various embodiments, in many different ways. As just one example, the computing device 300 may be arranged such that the processors 302 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 300 may be arranged such that: the processors 302 include two, three, four, five, or more multi-core processors; the network interface devices 306 include a first network interface device that implements Ethernet and a second network interface device that implements WiFi and/or Bluetooth; and the memory devices 304 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the consumer client system 104, system 100, system 102, provider client system 106, transaction processors 114 and 130, interfaces 110 and 116, transaction request database 112 and 118, each of which will be referred to individually for clarity as a "component" for the remainder of this paragraph, are implemented using an example of the computing device 300 of FIG. 3 (or a plurality of such devices). In such embodiments, the following applies for each component: (a) the elements of the computing device 300 shown in FIG. 3 (i.e., the one or more processors 302, one or more memory devices 304, one or more network interface devices 306, one or more display interfaces 308, and one or more user input adapters 310), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 304 (e.g., in various embodiments, in a volatile memory device such as a RAM or an instruction register and/or in a non-volatile memory device such as a flash memory or hard disk) and all actions described herein as performed by the software modules are performed by the processors 302 in conjunction with, as appropriate, the other elements in and/or connected to the computing device 300 (i.e., the network interface devices 306, display interfaces 308, user input adapters 310, and/or display device 312); (c) alternatively or additionally, to the extent it is described herein that the component processes and/or otherwise handles data, in some embodiments, such data is stored in the memory devices 304 (e.g., in some embodiments, in a volatile memory device such as a RAM and/or in a non-volatile memory device such as a flash memory or hard disk) and/or is processed/handled by the processors 302 in conjunction, as appropriate, the other elements in and/or connected to the computing device 300 (i.e., the network interface devices 306, display interfaces 308, user input adapters 310, and/or display device 312); (d) alternatively or additionally, in some embodiments, the memory devices 302 store instructions that, when executed by the processors 302, cause the processors 302 to perform, in conjunction with, as appropriate, the other elements in and/or connected to the computing device 300 (i.e., the memory devices 304, network interface devices 306, display interfaces 308, user input adapters 310, and/or display device 312), each or any combination of actions described herein as performed by the component and/or by any software modules described herein as included within the component.

Consistent with the preceding paragraph, as one example, in an embodiment where an instance of the computing device 300 is used to implement system 100 and/or system 102, the memory devices 304 could load or store transaction request databases 112 and/or 118, and/or store the data described herein as processed by transaction processors 114 and 120. Processors 302 could be used to (in conjunction with appropriately configured software) to execute the transaction processors 114 and 120 and the functionality associated therewith (e.g., to identify matches between different data transaction requests).

The hardware configurations shown in FIG. 3 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 3, (e) via other hardware arrangements, architectures, and configurations, and/or via combinations of the technology described in (a) through (e).

Technical Advantages of Described Subject Matter

In certain example embodiments, the techniques described herein allow for more efficient and/or flexible match processing against for two different sets of data transaction requests. In particular, data transaction requests that are received at one system, but routed to another, may carry with them a value that is based on a dynamically monitored value from the first system (e.g., the BBO). This approach allows the second system to operate based on the status of the first system—without having to completely mirror the status of the first system.

In certain examples, this approach also allows for selective routing of data transaction requests received at the first system to the second system. This advantageously allows for matching to occur using the private attributes of the second system, but for the matches to be reported using the public attributes of the first system.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-2B, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A distributed computer system comprising:
    a first transaction computer system that includes at least a first hardware processor, a first memory device configured to store a dual-sorted list of pending public data transaction requests, and a first transceiver;
    a second transaction computer system that includes at least a second hardware processor, a second memory device configured to store at least one private data transaction request, and a second transceiver;
    the first transaction computer system programmed to:
        repeatedly perform a first matching process, using requested public price values, against pending public data transaction requests stored in the dual-sorted list,
        receive, from a first client computer system, a first data transaction request that includes a requested price value,
        determine, for the first data transaction request, whether to perform, in response to reception of the first data transaction request, the first matching process for the first data transaction request, obtain a constraint value that is based at least in part on a current state of the dual-sorted list, based on determination that the first matching process is not to be performed in response to reception of the first data transaction request, generate a routing message that includes the constraint value and the first data transaction request, and transmit the routing message to the second transaction computer system;

the second transaction computer system programmed to:

receive, via the second transceiver, the routing message, identify a match, at a private price value, between the first data transaction request and the private data transaction request, where the private price value is based on the constraint value and is different from the requested price value and the constraint value, and based on identification of the match, transmit a match message back to the first transaction computer system; and the first transaction computer system further programmed to:

in response to reception of the match message, perform a process that confirms that the match between the first data transaction request and the private data transaction request is valid, and generate and transmit, to the first client computer system, a confirmation message that includes a public price value, which is different from the private price value, at which the match occurred between the first data transaction request and the private data transaction request, wherein the confirmation does not include the private price value.

2. The distributed computer system of claim 1, wherein the first transaction computer system is further configured to:

in response to reception of the first data transaction request, store, to the first memory device, a reference identifier that acts as a placeholder for the first data transaction request.

3. The distributed computer system of claim 2, wherein the first transaction computer system is further configured to:

receive, after the routing message is transmitted to the second transaction computer system and before the match message is received by the first transaction computer system, a cancelation or modification message that includes a request to cancel or modify the first data transaction request;

store, in association with the reference identifier, a request to cancel or modify the first data transaction request; and after reception of the match message, trigger the stored request to cancel or modify the first data transaction request.

4. The distributed computer system of claim 1, wherein the first transaction computer system is further configured to:

receive, from the first client computer system, a second data transaction request after the routing message is transmitted to the second transaction computer system and before the match message is received by the first transaction computer system, wherein the second data transaction request is not routed to the second transaction computer system; and hold match processing for the second data transaction request until at least the match message is received by the first transaction computer system.

5. The distributed computer system of claim 1, wherein the second transaction computer system is further configured to:

based on identification of the match, lock the private data transaction request such that it cannot be modified while locked; and in response to reception of an execution confirmation message sent by the first hardware processor, unlock the private data transaction request.

6. The distributed computer system of claim 1, wherein the second transaction computer system is further configured to:

generate and transmit, to a second client computer system that is associated with the private data transaction request, a confirmation message that includes private price value.

7. The distributed computer system of claim 1, wherein the second transaction computer system is further configured to:

perform a private matching process based on data for a second data transaction request received from the first transaction computer system against pending data transaction requests that include private matching attributes; and in response to determination that no match has been found for the second data transaction request, send a no match performed message to the first transaction computer system, wherein the first hardware processor is further configured to:

perform a matching process for the second transaction request against the dual-sorted list to identify at least one counter-party data transaction request to match against.

8. The distributed computer system of claim 1, wherein the second data transaction request includes an attribute amount that indicates what percentage of the second data transaction is eligible for matching against the dual-sorted list, wherein an amount for the identified match between the counter-party data transaction request and the second data transaction request is controlled based on the attribute amount.

9. The distributed computer system of claim 1, wherein the first transaction computer system further programmed to:

after reception of the match message, perform another matching process for a remainder of the first data transaction request not matched to the private data transaction request, the another matching process performed against the dual-sorted list of pending public data transaction requests.

10. A method of performing distributed transaction processing with a first transaction computer system that stores a dual-sorted list of pending public data transaction requests and a second transaction computer system that stores at least one private data transaction request, the method comprising:

repeatedly performing, at the first transaction computer system, a first matching process, using requested public price values, against pending public data transaction requests stored in the dual-sorted list;

receiving, from a first client computer system and at the first transaction computer system, a first data transaction request that includes a requested price value;

determining, for the first data transaction request, whether to perform, in response to reception of the first data transaction request, the first matching process for the first data transaction request;

based on determination that the first matching process is not to be performed in response to reception of the first data transaction request, generating, at the first transaction computer system, a routing message that includes a constraint value and the first data transaction request, wherein the constraint value is based at least in part on a current state of the dual-sorted list;

transmitting, using the first transaction computer system, the routing message to the second transaction computer system;

receiving, at the second transaction computer system, the routing message, identifying a match, at the second transaction computer system, between the first data transaction request and the private data transaction request, wherein the match is determined at a private price value that is different from the requested price value and the constraint value;

based on identification of the match, transmitting a match message back to the first transaction computer system from the second transaction computer system;

in response to reception of the match message at the first transaction computer system, perform a process that confirms that the match between the first data transaction request and the private data transaction request is still valid; and based on confirmation that the match is valid, transmitting, to the first client computer system, a confirmation message that includes a public price value, which is different from the private price value, at which the match occurred between the first data transaction request and the private data transaction request, wherein the confirmation does not include the private price value.

11. The method of claim 10, further comprising:
in response to reception of the first data transaction request, store, to the first memory device, a reference identifier that acts as a placeholder for the first data transaction request.

12. The method of claim 11, further comprising:
receiving, after the routing message is transmitted to the second transaction computer system and before the match message is received by the first transaction computer system, a cancelation or modification message that includes a request to cancel or modify the first data transaction request;

storing, in association with the reference identifier, a request to cancel or modify the first data transaction request; and after reception of the match message, triggering the stored request to cancel or modify the first data transaction request.

13. The method of claim 10, further comprising:
receiving, from the first client computer system, a second data transaction request after the routing message is transmitted to the second transaction computer system and before the match message is received by the first transaction computer system, wherein the second data transaction request is not routed to the second transaction computer system; and holding match processing for the second data transaction request until at least the match message is received by the first transaction computer system.

14. The method of claim 10, further comprising:

based on identification of the match, locking the private data transaction request such that it cannot be modified while locked; and in response to reception of an execution confirmation message sent by the first hardware processor, unlock the private data transaction request.

15. The method of claim 10, further comprising:
transmitting, to a second client computer system that is associated with the private data transaction request, a confirmation message that includes the private price value.

16. The method of claim 10, further comprising:
after reception of the match message, performing another matching process for a remainder of the first data transaction request not matched to the private data transaction request, the another matching process performed against the dual-sorted list of pending public data transaction requests.

17. The method of claim 10, wherein the second data transaction request includes an attribute amount that indicates what percentage of the second data transaction is eligible for matching against the dual-sorted list,
wherein an amount for the identified match between the counter-party data transaction request and the second data transaction request is controlled based on the attribute amount.

18. A non-transitory computer readable storage medium storing instructions for use with a distributed computer system that includes a first transaction computer system and a second transaction computer system, the first transaction computer system storing pending public data transaction requests and the second transaction computer system storing at least one private data transaction request, the stored instructions comprising instructions that, when executed, cause the computer system to:

repeatedly perform a first matching process, using requested public price values, against pending public data transaction requests stored in the dual-sorted list;

receive, from a first client computer system, a first data transaction request that includes a requested price value;

determine, for the first data transaction request, whether to perform, in response to reception of the first data transaction request, the first matching process for the first data transaction request, based on determination that the first matching process is not to be performed in response to reception of the first data transaction request, at the first transaction computer system, generate a routing message that includes a constraint value and the first data transaction request, wherein the constraint value is based on a dynamically changing value that is derived, at least in part, from a current state of the dual-sorted list;

transmit the routing message to the second transaction computer system from the first transaction computer system;

receive, at the second transaction computer system, the routing message;

identify, using the second transaction computer system, a match, at a private price value, between the first data transaction request and the private data transaction request, where the private price value is based on the constraint value and is different from the requested price value and the constraint value;

based on identification of the match, transmit a match message back to the first transaction computer system;

in response to reception of the match message, perform a process that confirms that the match between the first data transaction request and the private data transaction request is valid; and generate and transmit, to the first client computer system, a confirmation message that includes a public price value, which is different from the private price value, at which the match occurred between the first data transaction request and the private data transaction request, wherein the confirmation does not include the private price value.

19. The non-transitory computer readable storage medium of claim 18, wherein the stored instructions comprise further instructions that cause the distributed computer system to:

in response to reception of the first data transaction request, store, a memory device of the first transaction computer system, a reference identifier that acts as a placeholder for the first data transaction request.

20. The non-transitory computer readable storage medium of claim 18, wherein the stored instructions comprise further instructions that cause the distributed computer system to:

based on identification of the match, lock the private data transaction request such that it cannot be modified while locked; and in response to reception of an execution confirmation message sent by the first transaction computer system, unlock the private data transaction request for further processing.

\* \* \* \* \*